United States Patent Office 3,810,741
Patented May 14, 1974

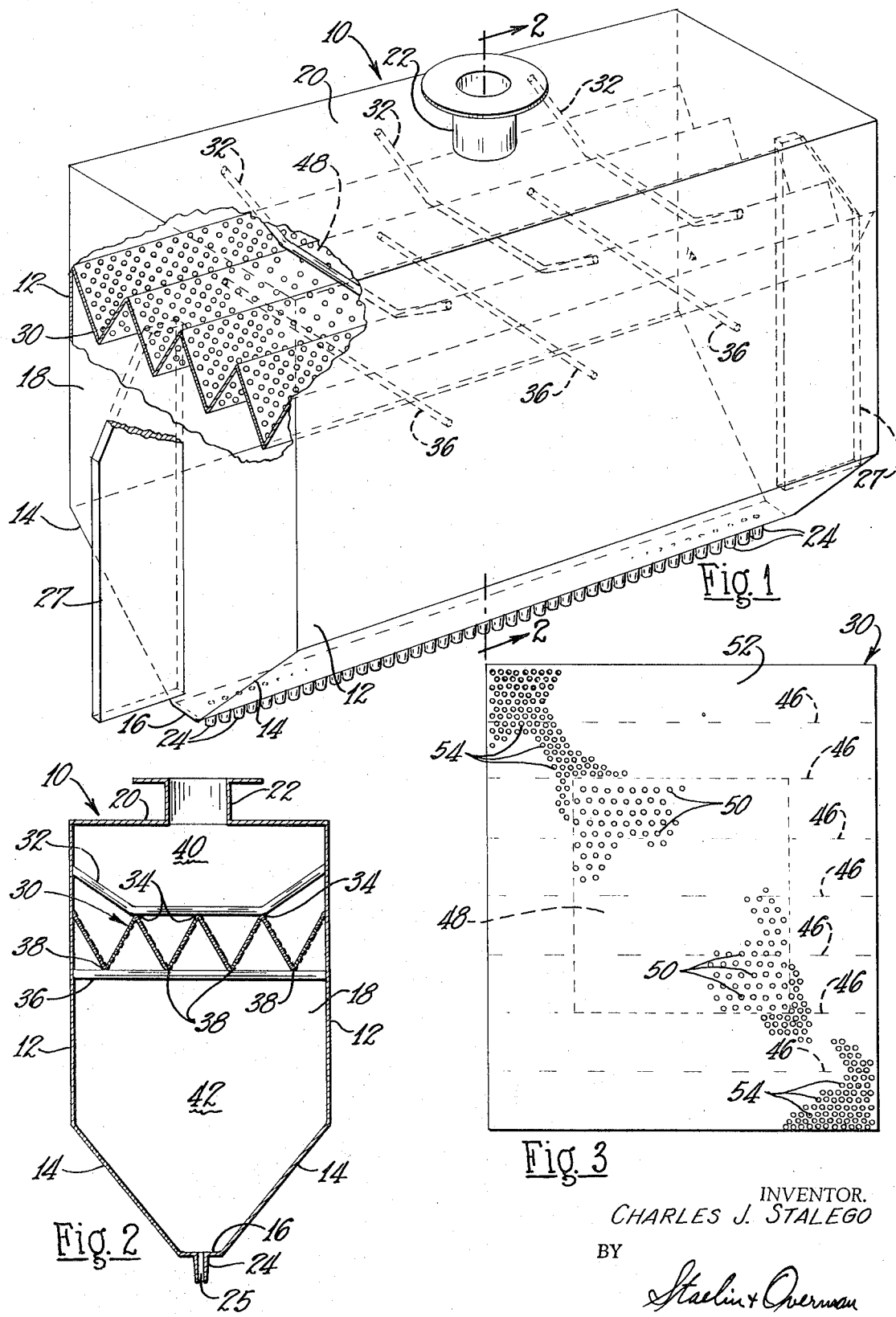

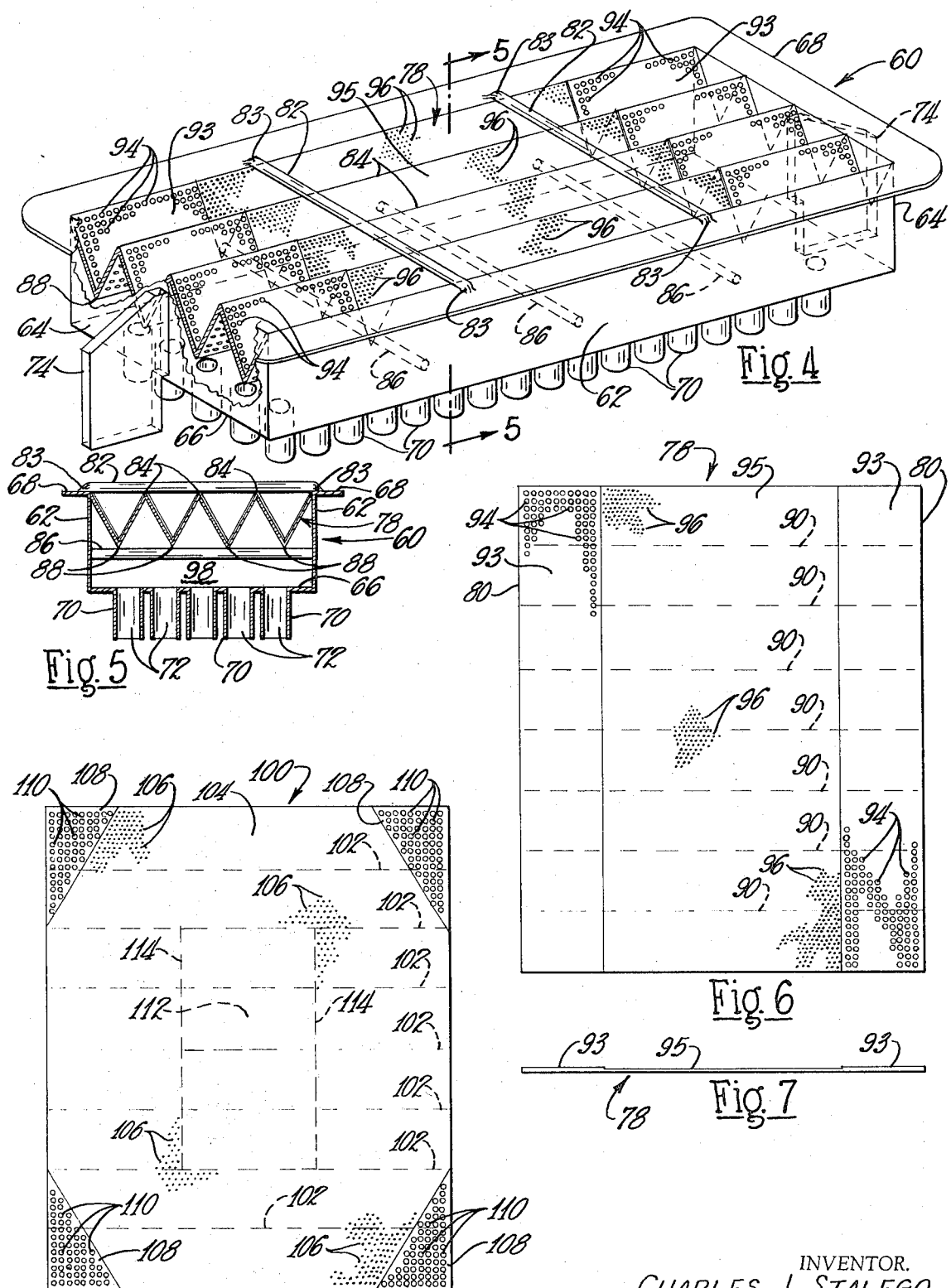

3,810,741
METHOD AND APPARATUS FOR PROCESSING GLASS AND CONTROLLING THE THERMAL PATTERN IN A STREAM FEEDER
Charles J. Stalego, Newark, Ohio, assignor to Owens-Corning Fiberglas Corporation
Filed May 21, 1971, Ser. No. 145,683
Int. Cl. C03b *37/02*
U.S. Cl. 65—2       7 Claims

ABSTRACT OF THE DISCLOSURE

The disclosure embraces a method of and means for controlling a thermal or heat pattern and a distribution pattern of heat-softened material, such as glass, in an electrically-heated feeder having an orificed region for flowing streams of the heat-softened material wherein a current-conducting instrumentality in the feeder is configurated with groups of glass flow openings or perforations of different sizes in areas of the instrumentality to provide a more uniform heat pattern in the glass in the feeder and promote flow of substantially uniform streams of glass from the orifices of the feeder.

---

This invention relates to a method of and apparatus for controlling a thermal or heat pattern in the glass in a stream feeder or bushing for flowing streams of glass for attenuation to fibers or filaments, and more especially for controlling the flow of glass through openings in a glass heating instrumentality of a character wherein glass flow openings or perforations in the heating instrumentality are proportioned in size whereby lower temperature glass flows through larger perforations and heat from the hotter glass is transferred to the glass in the cold areas and thereby promotes a more thermally balanced glass below the heating instrumentality at the region of the feeder from which flow streams of glass so that the streams are of substantially the same viscosity.

It has been conventional practice in heating glass in a stream feeder from which flow streams of glass for attenuation to fibers or filaments to flow electric current through a heater strip disposed in the feeder which has a large number of openings or perforations of uniform size for the purpose of preventing passage of stones or pieces of unmelted glass. In arrangements of this character, flow of glass of colder areas through the perforations is restricted because of the higher viscosity, resulting in an unbalanced thermal pattern in the glass below the perforated heater strip.

In the use of a perforated current conducting heater strip of this character, various operating conditions also foster a nonuniform heat pattern in the glass in the feeder and hence nonuniform viscosity of the molten glass in certain zones of the feeder. For example, factors such as glass composition, the depth of a stream feeder, the insulation surrounding the feeder and the flow path of electric current through the glass in a feeder cause variations in a thermal pattern and hence variations in viscosity of the glass in different regions in the stream feeder. In most stream feeders, the glass at certain regions in a feeder tends to be at higher temperatures than the glass in other regions. Under certain operating conditions, the temperature of the glass adjacent the sides and ends of the feeders tends to be higher than the temperature of the glass in other regions of the feeders. In certain feeders under other operating conditions substantially the reverse condition may exist wherein glass adjacent the side regions of the feeder may be at lower temperatures than the glass in the central region. In other stream feeders the glass in the corner regions of a feeder may be at lower temperatures than the temperature of the glass in other regions.

Under varying operating conditions the glass at one region or regions may be of lesser viscosity than the viscosity of glass in other regions. Hence, glass delivered from a region of low viscosity tends to flow at a higher rate resulting in streams of nonuniform characteristics. Where the streams are attenuated by mechanical means into filaments, the filaments may vary considerably in size. In a method wherein the streams are attenuated to primary filaments and the primary filaments engaged by a high velocity gaseous blast and attenuated into fibers, it is found that primary filaments varying in size result in attenuated fibers of widely varying sizes.

In methods wherein spherical pieces or marbles of refined glass are introduced into a feeder through an entrance tube and are melted by current flow through a heater strip into the feeder, the molten glass at the region of the cold glass marbles is of a substantially high viscosity while the glass in other regions of the feeder is of lower viscosity. In stream feeder constructions wherein glass in molten condition is flowed from a forehearth into a feeder, the glass at the central region of a feeder is usually of a higher temperature and less viscosity than the glass adjacent the end regions of the feeder.

The present invention embraces a method of controlling and proportioning the flow rates of glass through perforated areas of a heating instrumentality in a feeder to promote transfer of heat from the hotter glass toward regions of glass of lower temperature to provide a more uniform heat pattern by establishing different flow rates of glass through various regions of a heating instrumentality whereby the throughput of glass through the perforations in the heating instrumentality is more uniform and glass streams flowing through the orifices of the feeder are of substantially uniform viscosity.

A further object of the invention resides in a method of applying heat to glass in a glass stream feeder through the use of a perforated electric heating instrumentality to provide for heat stabilization in the glass adjacent the region of the heating instrumentality to render the glass of more uniform viscosity at the stream flow region of the feeder.

Another object of the invention resides in the provision of a perforated heater strip or instrumentality in a glass stream feeder wherein the heater strip or instrumentality is of multiple V-shape to provide large surface contact with the glass, and in areas of the glass in the feeder above the instrumentality which are at differential temperatures, the heater strip or instrumentality is provided with groups of perforations of different sizes promoting more uniform throughput of glass through the perforations and a more stabilized heat pattern in the glass.

Another object of the invention resides in the provision of control of the flow of molten glass through the use in a glass stream feeder of a current-conducting heating instrumentality provided with perforations of different sizes arranged in groups in different regions of the instrumentality to promote more uniform glass flow through all of the perforations, and in certain regions the thickness of the instrumentality is modified to compensate for the variations in electric current flow due to the differences in resistance of areas containing different size perforations so that the resistance to current flow through all regions of the perforated instrumentality is substantially uniform.

A further object of the invention resides in a method of controlling the heating of glass in various areas of a stream feeder utilizing a perforated electric heating instrumentality wherein glass flow through perforations in the heating instrumentality is proportioned to promote a more uniform heat pattern in the glass and hence a more uniform viscosity of the glass at the stream flow region whereby streams of glass flowed from the feeder have substantially uniform characteristics.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention, which may be preferred, in which:

FIG. 1 illustrates an isometric view of a glass stream feeder embodying a perforated heating instrumentality for carrying out the method of the invention, a portion of the feeder being broken away for purposes of illustration;

FIG. 2 is a transverse sectional view of the construction illustrated in FIG. 1;

FIG. 3 is an expanded plan view of the heating instrumentality shown in FIG. 1;

FIG. 4 is an isometric view of another form of stream feeder embodying a modified form of glass heating instrumentality, a portion of the stream feeder being broken away for purposes of illustration;

FIG. 5 is a transverse sectional view of the stream feeder and glass heating instrumentality shown in FIG. 4;

FIG. 6 is an expanded plan view of the heating instrumentality shown in FIG. 4;

FIG. 7 is an end view of the heating instrumentality shown in FIG. 6;

FIG. 8 is an expanded plan view illustrating a further form of heating instrumentality, and FIG. 9 is an end view of the heating instrumentality shown in FIG. 8.

The method and apparatus of the invention are usable with various types and sizes of stream feeders having orificed regions for flowing streams of heat-softened mineral material, such as glass, and may be employed with feeders of a character for flowing streams of glass for attenuation to fibers by engaging the streams with high velocity gaseous blasts, or with feeders for flowing streams of glass for attenuation to continuous filaments by mechanical attenuation.

Referring to the drawings in detail, and initially to FIG. 1, there is illustrated an elongated stream feeder construction 10 which, in the embodiment shown, is inclusive of a melting region and a stream flow region. The feeder 10 comprises side walls 12, slanting or convergently arranged walls 14, a stream flow region or floor 16, and end walls 18. The construction includes a cover 20 provided with a tubular means or member 22 through which bodies of glass, such as glass marbles, are delivered into the melting region of the stream feeder construction.

In the arrangement shown in FIGS. 1 and 2, the floor 16 is provided with a plurality of projections 24, the projections having orifices or passages 25 through which streams of glass flow from the feeder. While a single row of projections 24 is illustrated in FIGS. 1 and 2, it is to be understood that the floor may be provided with a plurality of rows of tubular projections. Streams of glass flowing from the orificed projections 24 may be engaged by downwardly directed gaseous blasts in a well known manner for attenuating the streams to fibers.

Each end wall 18 of the feeder is equipped with a terminal lug or member 27 adapted to be engaged by a connector (not shown) for connecting electric current supply conductors to the terminal lugs 27. The feeder 10 is fabricated of metal or metal alloy, such as an alloy of platinum and rhodium capable of withstanding the temperature of molten glass. Disposed within the feeder 10 is an electric heating instrumentality or heater strip 30 containing groups of perforations wherein the perforations of one group are of a different size than perforations of another group for purposes hereinafter explained.

The heater strip 30 is of metal or metal alloy, such as an alloy of platinum and rhodium, the strip 30 extending longitudinally of the feeder, the ends of the heater strip being welded to the respective end walls 18 to provide for electric current flow lengthwise through the heater strip. As particularly shown in FIGS. 1 and 2, the heater strip 30 is preferably of generally corrugated or multiple V-shape configuration to provide substantial area of contact of the glass with the heater strip. Disposed above the heated strip and extending transversely of the feeder are support rods or members 32 having their ends welded to the side walls 12.

The intermediate regions of the rods or support members 32 are disposed horizontally and the apices 34 of the heater strip are welded to the rods 32. Disposed beneath the heater strip 30 is a second group of transversely extending rods or support members 36, the ends of the rods 36 being welded to the side walls 12. The depending apices 38 of the heater strip 30 are welded to the support rods 36.

The support rods 32 and 36 are of an alloy of platinum and rhodium and function to prevent sagging of the comparatively thin heater strip 30. The region of the feeder above the heater strip provides a glass melting zone 40 and the region 42 of the feeder below the heater strip provides a glass conditioning and thermal stabilizing zone. The glass moves downwardly through the conditioning zone 42 at a comparatively slow rate providing a time-temperature treatment for the glass to provide for a more homogeneous glass for delivery through the orificed projections 24.

In the use of the arrangement shown in FIGS. 1 and 2, spherical pieces or marbles, or cullet of refined glass are delivered through the tube 22 into the melter zone 40 above the heater strip 30. While a single tube 22 is illustrated in the drawings, it is to be understood that additional marble feed tubes may be employed. The marbles of glass delivered into the melter zone 40 are comparatively cold and are progressively reduced to a molten state or condition by heat generated by flow resistance of electric current through the heater strip 30.

As electric current also flows through the end and side walls of the feeder construction 10, the glass adjacent the end and side walls is heated to a higher temperature and hence is of lower viscosity than the temperature and viscosity of the glass at the central region adjacent the heater strip. If the perforations in the heater strip were of uniform size throughout the area of the strip, the glass adjacent the side and end regions would flow through the perforations at a much higher rate than the colder glass at the central region.

In the method and arrangement of the invention the heater strip 30 is provided with perforations or openings of different sizes for proportioning flow rates of glass through the perforations or openings in order to provide a more uniform heat pattern in the glass below the heater strip and promote a more uniform throughput or flow of glass through the perforated areas of the feeder strip. An expanded view of the heater strip 30, shown in FIG. 3 and embodied in the arrangement shown in FIG. 1, is illustrative of areas provided with groups of comparatively large openings and smaller openings.

As the marbles or pieces of glass are introduced into the feeder through the tube 22 into the central region of the melter zone of the feeder, the cooler glass is present at the central area of the feeder above the heater strip 30.

With reference to FIG. 3, the fold lines or regions of the heater strip providing the apices of the generally corrugated or multiple V-shaped heater strip are indicated by broken lines 46. The area 48, shown in FIGS. 1 and 3, being the central region of the heater strip is adjacent the colder glass in the melter zone of the feeder above the heater strip. The area 48 of the heater strip 30 has a plurality or group of comparatively large openings 50. The peripheral region 52 of the heater strip adjacent and surrounding the central region 48 is provided with a greater number of smaller openings 54 per unit of area than the number of openings 50 per unit of area.

The larger openings 50 facilitate or provide for increased flow of the more viscous or colder glass at the central region 48 through the heater strip or screen 30, while the glass adjacent the smaller openings 54 is of a higher temperature and hence lower viscosity and the flow or throughput of the hotter glass through the larger number of small openings 54 is comparable or substantially equal to the flow or throughput of glass through the larger openings 50 at the central region.

Heat from the hotter glass is transferred to the cooler glass below the heater strip by reason of the differential temperatures, and this transfer of heat promotes a more uniform or stabilized heat pattern in the glass in the region 42 beneath the heater strip 30. An objective of the invention is to render the glass beneath the heater strip of substantially uniform temperature and viscosity throughout the cross sectional area of the conditioning zone 42 of the feeder and particularly at the stream flow region adjacent the orificed projections 24.

While the arrangement of groups of large and small openings illustrated in FIGS. 1 and 3 provides improved equalization of the throughput of glass through areas of the heater strip and a stabilized heat pattern in the particular feeder illustrated in FIG. 1, it is to be understood that the heat pattern of similar feeders may vary and that the pattern or arrangement of large and small openings illustrated in FIG. 3 may be varied or modified in order to provide proper heat stabilization so that the glass is of substantially uniform temperature and viscosity at the region of delivery of streams from the feeder.

As the more viscous colder glass flows at a slower rate, the openings 50 are proportioned in size and number per unit of area with respect to the size and number per unit of area of the smaller openings 54 so that the flow of colder glass through the larger openings 50 and the flow of hotter glass through the larger number of smaller openings 54 is such that heat is transferred from the hotter glass adjacent the end and side regions of the feeder below the heater strip to the colder glass at the central region below the heater strip.

The transfer of heat occurs during the downward movement of the glass in the zone 42 so that the glass approaching the lower region of the feeder chamber adjacent the orificed projections 24 will be of substantially uniform temperature and viscosity, a condition which is essential to the delivery of streams having uniform characteristics from the orifices 25 of the projections 24.

It is found that with various types and sizes of glass stream feeders, the thermal conditions vary widely requiring different arrangements and sizes of larger and small openings in the heater strip and in different areas of the heater strip. It is found that the small openings or perforations 54 may be in a range of about twenty-five thousandths to sixty thousandths of an inch in diameter, and the larger openings or perforations may be within a range of about eighty thousandths to one hundred twenty-five thousandths of an inch in diameter.

The number of small openings or perforations, such as perforations 54, may be within a range of about one hundred thirty and one hundred ninety perforations per square inch. The larger openings or perforations, such as the perforations 50 accommodating the flow of colder glass, may be in a range of about eighty thousandths and one hundred twenty-five thousandths of an inch in diameter. The number of the larger perforations per square inch may be within a range of about fifty and seventy perforations per square inch.

FIGS. 4 and 5 illustrate another form of elongated stream feeder embodying a modified heater strip, the form of stream feeder being of a character for installation with a forehearth of a glass melting furnace, the feeder receiving molten glass from the forehearth. FIG. 6 is an expanded plan view of one form of heating instrumentality that may be embodied in the feeder shown in FIGS. 4 and 5.

The stream feeder construction 60, illustrated in FIGS. 4 and 5, is inclusive of side walls 62, end walls 64 and a stream flow region or floor 66. The upper region of the feeder is provided with a peripheral flange 68 which is engaged with the forehearth of a glass furnace, the floor region of the forehearth in registration with the feeder being provided with a passage for flowing glass from the forehearth into the feeder. The feeder 60 is fabricated of metal or metal alloy, such as an alloy of platinum and rhodium capable of withstanding the temperature of molten glass.

The floor 66 of the feeder is provided with a plurality of rows of tubular projections or tips 70, each projection having a passage or orifice 72 through which flows a stream of glass. The streams of glass may be attenuated to fibers or filaments by well known conventional means. Each end wall 64 of the feeder is equipped with a terminal lug or member 74 adapted to be engaged by a connector (not shown) for connecting electric current supply conductors to the terminal lugs 74.

Disposed in the feeder 60 and extending lengthwise thereof is an electric heating instrumentality or heater strip 78 containing groups of perforations or openings wherein the perforations or openings of one group are of a different size than perforations of another group for proportioning flow rates of glass through the heater strip. The heater strip 78 is of metal or metal alloy, such as an alloy of platinum and rhodium, the ends 80 of the heater strip being welded to the respective end walls 64 of the feeder to provide for electric current flow lengthwise through the heater strip.

As shown in FIGS. 4 and 5, the heater strip 78 is preferably of generally corrugated or multiple V-shape configuration to provide substantial area of contact of the molten glass with the heater strip. Disposed above the heater strip and extending transversely of the feeder are support rods or members 82 having their ends welded to the flange 68 as shown at 83. The apices 84 of the heater strip 78 are welded to the transversely extending supports 82.

Disposed beneath the heater strip 78 is a group of transversely extending rods or support members 86, the ends of the rods 86 being welded to the side walls 62. The depending apices 88 of the heater strip are welded to the support rods or members 86. The support rods or members 82 and 86 are of an alloy of platinum and rhodium, the rods or members preventing sagging of the comparatively thin heater strip 78. With reference to FIG. 6, the fold regions of the heater strip 78, providing the apices 84 and 88 of the configurated strip, are indicated by broken lines 90.

In the use of the stream feeder illustrated in FIGS. 4 and 5, the glass in the proximity of the end walls 64 tends to be colder or of lower temperature than the glass in the central region of the feeder. If all of the perforations in the heater strip were of uniform size, an unstable heat pattern would exist in the glass beneath the heater strip by reason of the reduced flow rate of colder and more viscous glass in the proximity of the end walls.

As illustrated in FIGS. 4 and 6, the regions or areas 93 of the heater strip 78 in proximity of the end walls 64 are fashioned with groups of openings 94 of one size and the central region or area 95 of the heater strip provided with openings 96 of a different size. In the arrangement illustrated in FIGS. 4 and 6, the openings 94 are of larger size or diameter than the size or diameter of the openings 96. Thus the flow of the more viscous colder glass adjacent the openings 94 is facilitated through the larger openings 94 in order to increase the flow rate of the colder glass to the region below the heater strip.

The openings 96 in the central region 95 are of smaller size and of a greater number per unit of area than the openings 94. The glass adjacent the central region 95 tends to be of a higher temperature than the glass adjacent the end regions of the feeder and the hotter glass, being of lesser viscosity, flows readily through the smaller openings 96. Thus, the flow or throughput of the hotter glass through the larger number of smaller openings 96 is comparable or substantially equal to the flow or throughput of glass through the larger openings 94 in the end regions or areas 93 of the heater strip.

In the zone 98 below the heater strip, heat from the hotter glass at the central region is transferred to the cooler glass adjacent the end regions of the feeder by reason of the differential temperatures, and this transfer of heat from the hotter glass in the central region to the colder glass in the end regions promotes a more uniform or stabilized heat pattern in the glass in the zone or region 98 of the feeder.

By controlling the heat pattern in the glass in the manner described, the glass beneath the heater strip in the region 98 is of substantially uniform temperature and viscosity and streams of glass of substantially uniform characteristics are delivered from all of the passages 72 in the tubular tips or projections 70.

The small openings or perforations 96 in the heater strip 78 may be in a range of about twenty-five thousandths to sixty thousandths of an inch in diameter, and the number of openings 96 may be within a range of about one hundred thirty and one hundred ninety per square inch. The larger openings 94 may be in a range of about eighty thousandths and one hundred twenty-five thousandths of an inch in diameter, and the number of such openings may be within a range of about fifty and seventy perforations per square inch.

As the open area of larger openings and the open area of smaller openings may be different, the resistance to electric current flow in the areas of metal of the strip adjacent different size openings may vary, and it is desirable that the resistance to current flow be substantially uniform throughout the area of metal of the strip. FIG. 7 is an end view of the heater strip 78 shown in FIG. 6. In order to compensate for differences in electrical resistance of the areas 93 with respect to the area 95, the metal at the areas 93 may be of increased thickness as compared with the thickness of the metal of the central region 95 of the heater strip as shown in FIG. 7.

By increasing the thickness of the metal at a particular area, such as the areas 93, the resistance to current flow through the metal of the areas 93 may be made comparable or substantially equal to the resistance to current flow of the metal adjacent the openings 96. The differential in thickness of the metal of the strip between the areas 93 and the area 95 is dependent upon the relative sizes of the openings of the areas and the number of opening per square inch, as the amount of current conducting metal adjacent the openings of different sizes determines the differential in resistance to current flow through the different areas.

Compensation for these differences may be attained by modifying the thicknesses of the metal at the regions of different size openings. For example, where the thickness of the metal at the area 95 may be in a range of about eighteen thousandths to twenty-five thousandths of an inch, the thickness of the areas 93 may be within a range of about thirty thousandths to fifty thousandths of an inch in order to attain or establish more uniform resistance to electric current flow throughout all of the metal areas.

It is to be understood that while in most instances differential resistance to current flow may be compensated by varying the thicknesses of metal of different regions of the strip within the ranges above set forth, it may be that for establishing heat patterns in feeders of other types, that the differential in metal thicknesses of areas of different hole sizes may be varied to an extent necessary to secure substantially balanced resistance to current flow throughout a heater strip.

FIGS. 8 and 9 are illustrative of a form of heater strip fashioned of an alloy of platinum and rhodium that may be used in stream feeders wherein the glass in the corner regions of the feeder above the heater strip is colder or of lesser temperature than the glass adjacent the central region above the heater strip. The heater strip 100, shown in FIGS. 8 and 9, is of the general configuration of the heater strip 78, the strip being of undulated or multiple V-shaped configuration, the fold lines for the apices being illustrated in broken lines at 102 in FIG. 8.

In this form of heater strip, the area or a substantial portion of the area of the central region 104 is provided with a large number of comparatively small perforations or openings 106 per unit of area, and the corner regions 108 provided with a comparatively small number of larger openings 110 of a size to increase the flow through the openings 110 of the more viscous cold glass at the corner regions.

In the region beneath the heater strip in the feeder, the heat from the hotter glass from the central region is transferred to the colder glass at the corner regions to provide a stabilized heat pattern in the glass throughout the area beneath the heater strip so that a conditioned glass of more uniform viscosity is provided for delivery through stream flow orifices of the feeder.

In the heater strip 100, the metal of the corner regions 108 may be of increased thickness, as illustrated in FIG. 9, to more nearly balance resistance to electric current flow through the heater strip. The comparatively small perforations or openings 106 and the number of such perforations per square inch may be in the range specified for the perforations 96, shown in FIG. 6, and the size of the perforations or openings 110 and the number of such perforations per square inch may be within the range hereinbefore specified for the perforations 94 shown in FIG. 6.

In the use of the thermal control heater strip of the invention in certain feeders of the general character shown in FIGS. 4 and 5 into which molten glass is delivered from a forehearth and extremely hot glass is present in the mid zone of the central region above the heater strip, it is found that by providing an unperforated mid zone of the central region of the heater strip that a more satisfactory stabilized heat balance or pattern beneath the heater strip may be attained. An unperforated mid zone of the heater strip is illustrated at 112 in FIG. 8, the area 112 being defined by the broken lines 114.

In the use of such form of heater strip, the glass of highest temperature at the mid zone above the heater strip, being of low viscosity, readily flows away from the mid zone into and through the openings in the central region of the heater strip bounding such mid zone, and the heat from such glass beneath the openings is readily transferred to the cooler glass.

While the forms of heater strip illustrated in the drawings and herein described are exemplary of configurations of the heater strip and various orientations of groups of openings or perforations in a heater strip so as to properly proportion the flow rates of the glass through perforated areas to attain a stabilized heat pattern in the glass below the heater strip, it is to be understood that other arrangements of stream flow areas in a heater strip having openings of various sizes may be employed within the scope of the invention as herein described.

It is apparent that, within the scope of the invention, modifications and different arrangements may be made other than as herein disclosed, and the present disclosure is illustrative merely, the invention comprehending all variations thereof.

I claim:

1. The method of controlling the heat pattern in the glass in an electrically heated feeder provided with openings through which flow streams of the glass including delivering glass into an upper region of the feeder, flowing electric current through a perforated heating strip in the feeder, flowing glass of different temperatures through groups of perforations in the heating strip wherein the perforations of one group are of larger size than the perforations of another group to substantially equalize the flow of glass through the groups of perforations, and proportioning the thickness of the portion of the strip having the group of perforations of larger size relative to the thickness of the portion of the strip having the group of perforations of lesser size to effect a substantially uniform resistance to electric current flow throughout the current conducting regions of the heating strip.

2. Apparatus of the character disclosed, in combination, a stream feeder having a stream flow region for delivering streams of heat-softened glass, said feeder having means for connection with a supply of electric current, a current conducting heating strip in said feeder, said heating strip having groups of perforations through which glass flows to a region beneath the heating strip, the perforations of a first group adjacent a region of glass of low viscosity being of comparatively small size, the perforations of a second group at the region of glass of higher viscosity being of larger size and of a lesser number per unit of area whereby to substantially balance the throughput of glass through the large and small perforations so that heat from the lower viscosity glass is transferred to the glass of higher viscosity beneath the heating strip for stabilizing the heat pattern in the glass, the thickness of the strip at the region of the perforations of the second group being greater than the thickness of the strip at the region of the first group.

3. The combination according to claim 2 wherein the size of the small perforations is in a range of about twenty thousandths to sixty thousandths of an inch in diameter and the number of the small size perforations within a range of about one hundred thirty and one hundred ninety perforations per square inch.

4. The combination according to claim 2 wherein the size of the larger perforations is in a range of about eighty thousandths to one hundred twenty-five thousandths of an inch in diameter, and the number of the larger perforations being within a range of about fifty and seventy perforations per square inch.

5. The combination according to claim 2 wherein the smaller size perforations are in the central region of the heating strip, and the larger perforations in the end regions of the heating strip.

6. The combination according to claim 2 wherein a mid zone of the heating strip is unperforated, the region adjacent the unperforated zone having the small size perforations, and the corner regions having the larger size perforations.

7. Apparatus of the character disclosed, in combination, a stream feeder having a stream flow region for delivering streams of heat-softened glass, said feeder having means for connection with a supply of electric current, a current conducting heating strip in said feeder, said heating strip having groups of perforations of different sizes in different areas through which glass flows to a region beneath the heating strip, the group of perforations of larger size accommodating increased flow of glass of lower temperature for stabilizing the heat pattern in the glass below the heating strip, the thickness of the heating strip at the area having the group of perforations of larger size being greater than the thickness of the area of the strip having the group of perforations of lesser size to substantially equalize resistance to electric current flow through all regions of the heater strip.

References Cited

UNITED STATES PATENTS 3,511,916    5/1970    Sinclair et al. _____ 65—12 X

ROBERT L. LINDSAY, JR., Primary Examiner

U.S. Cl. X.R.

65—11 W, 12